United States Patent
Andersen et al.

(10) Patent No.: US 9,097,505 B2
(45) Date of Patent: Aug. 4, 2015

(54) FIBER OPTIC TRANSDUCERS, FIBER OPTIC ACCELEROMETERS AND FIBER OPTIC SENSING SYSTEMS

(75) Inventors: James Kengo Andersen, Westlake Village, CA (US); Eric Lee Goldner, Valencia, CA (US); Agop Hygasov Cherbettchian, Santa Monica, CA (US); Gerald Robert Baker, West Hills, CA (US); David T. Beatson, Kennett Square, PA (US)

(73) Assignee: US Seismic Systems, Inc., Chatsworth, CA (US)

( * ) Notice: Subject to any disclaimer, the term of this patent is extended or adjusted under 35 U.S.C. 154(b) by 570 days.

(21) Appl. No.: 13/263,342

(22) PCT Filed: Oct. 22, 2010

(86) PCT No.: PCT/US2010/053659
§ 371 (c)(1),
(2), (4) Date: Jun. 25, 2012

(87) PCT Pub. No.: WO2011/050227
PCT Pub. Date: Apr. 28, 2011

(65) Prior Publication Data
US 2012/0257208 A1    Oct. 11, 2012

Related U.S. Application Data

(60) Provisional application No. 61/279,607, filed on Oct. 23, 2009.

(51) Int. Cl.
*G01B 9/02* (2006.01)
*G01H 9/00* (2006.01)
(Continued)

(52) U.S. Cl.
CPC .......... *G01B 9/02014* (2013.01); *G01B 9/0201* (2013.01); *G01B 9/02027* (2013.01);
(Continued)

(58) Field of Classification Search
CPC .............. G01B 9/02014; G01B 9/0201; G01B 9/02027; G01V 1/181; G01D 5/353; G01P 15/093; G01H 9/004; H04R 7/20; H04R 7/24
USPC ........................................................ 356/477
See application file for complete search history.

(56) References Cited

U.S. PATENT DOCUMENTS 4,155,005 A    5/1979    Knowlton et al.
4,255,015 A    3/1981    Adams et al.
(Continued)

FOREIGN PATENT DOCUMENTS

CN    2330114 Y    7/1999
CN    2643296      9/2004
(Continued)

OTHER PUBLICATIONS

International Search Report for International Application No. PCT/US2012/051338 issued by the Korean Intellectual Property Office on Mar. 14, 2013.
(Continued)

Primary Examiner — Tarifur Chowdhury
Assistant Examiner — Jonathon Cook
(74) Attorney, Agent, or Firm — Stradley Ronon Stevens & Young, LLP

(57) ABSTRACT

A fiber optic transducer is provided. The fiber optic transducer includes a fixed portion configured to be secured to a body of interest, a moveable portion having a range of motion with respect to the fixed portion, a spring positioned between the fixed portion and the moveable portion, and a length of fiber wound between the fixed portion and the moveable portion. The length of fiber spans the spring. The fiber optic transducer also includes a mass engaged with the moveable portion. In one disclosed aspect of the transducer, the mass envelopes the moveable portion.

54 Claims, 14 Drawing Sheets

(51) Int. Cl.
  *G01P 15/093* (2006.01)
  *G01V 1/18* (2006.01)
  *G01D 5/353* (2006.01)

(52) U.S. Cl.
  CPC ........ *G01D5/35312* (2013.01); *G01D 5/35377* (2013.01); *G01H 9/004* (2013.01); *G01P 15/093* (2013.01); *G01V 1/181* (2013.01)

(56) References Cited

U.S. PATENT DOCUMENTS

| | | |
|---|---|---|
| 4,292,628 A | 9/1981 | Sadler |
| 4,800,267 A | 1/1989 | Freal et al. |
| 4,826,322 A | 5/1989 | Philips |
| 4,879,755 A | 11/1989 | Stolarczyk et al. |
| 4,893,930 A | 1/1990 | Garrett et al. |
| 4,994,668 A | 2/1991 | Lagakos et al. |
| 5,011,262 A | 4/1991 | Layton |
| 5,051,799 A | 9/1991 | Paul et al. |
| 5,172,117 A | 12/1992 | Mills et al. |
| 5,218,420 A * | 6/1993 | Asmar ............. 356/480 |
| 5,227,857 A | 7/1993 | Kersey |
| 5,367,376 A | 11/1994 | Lagakos et al. |
| 5,369,485 A * | 11/1994 | Hofler et al. ............. 356/477 |
| 5,397,891 A | 3/1995 | Udd et al. |
| 5,493,390 A | 2/1996 | Varasi et al. |
| 5,680,489 A | 10/1997 | Kersey |
| 5,712,932 A | 1/1998 | Alexander et al. |
| 5,798,834 A | 8/1998 | Brooker |
| 5,986,749 A | 11/1999 | Wu et al. |
| 6,104,492 A | 8/2000 | Giles et al. |
| 6,157,711 A | 12/2000 | Katz |
| 6,281,976 B1 | 8/2001 | Taylor et al. |
| 6,328,837 B1 | 12/2001 | Vohra et al. |
| 6,381,048 B1 | 4/2002 | Chraplyvy et al. |
| 6,453,022 B1 | 9/2002 | Weinman, Jr. |
| 6,496,264 B1 * | 12/2002 | Goldner et al. ............. 356/478 |
| 6,654,521 B2 | 11/2003 | Sheng et al. |
| 6,819,812 B2 | 11/2004 | Kochergin et al. |
| 6,891,621 B2 | 5/2005 | Berg et al. |
| 6,900,726 B2 | 5/2005 | Graves |
| 6,955,085 B2 * | 10/2005 | Jones et al. ............. 73/514.26 |
| 7,013,729 B2 | 3/2006 | Knudsen et al. |
| 7,282,697 B2 | 10/2007 | Thomas et al. |
| 7,683,312 B2 | 3/2010 | Goldner et al. |
| 7,840,105 B2 | 11/2010 | Goldner et al. |
| 7,994,469 B2 | 8/2011 | Goldner et al. |
| 7,999,946 B2 | 8/2011 | Andersen et al. |
| 2002/0063866 A1 | 5/2002 | Kersey et al. |
| 2002/0064331 A1 | 5/2002 | Davis et al. |
| 2002/0064332 A1 | 5/2002 | Martin |
| 2003/0094281 A1 | 5/2003 | Tubel |
| 2003/0145654 A1 | 8/2003 | Knudsen et al. |
| 2004/0046111 A1 | 3/2004 | Swierkowski |
| 2004/0060697 A1 | 4/2004 | Tilton |
| 2004/0246816 A1 | 12/2004 | Ogle |
| 2005/0076713 A1 | 4/2005 | Knudsen |
| 2005/0097955 A1 | 5/2005 | Berg et al. |
| 2005/0111788 A1 | 5/2005 | Tsuyama |
| 2006/0120675 A1 | 6/2006 | Goldner et al. |
| 2007/0065149 A1 | 3/2007 | Stevens et al. |
| 2008/0137589 A1 | 6/2008 | Barrett |
| 2008/0229825 A1 * | 9/2008 | Crickmore et al. ........ 73/514.26 |
| 2009/0101800 A1 | 4/2009 | Goldner et al. |
| 2009/0140852 A1 | 6/2009 | Stolarczyk et al. |
| 2009/0210168 A1 | 8/2009 | Vincelette |
| 2010/0005860 A1 | 1/2010 | Coudray et al. |
| 2010/0219334 A1 | 9/2010 | LeGrand |

FOREIGN PATENT DOCUMENTS

| | | |
|---|---|---|
| CN | 101199413 | 6/2008 |
| CN | 101359882 A | 2/2009 |
| JP | 2001-221684 | 8/2001 |
| JP | 2006-172339 | 6/2006 |
| JP | 2007-232515 | 9/2007 |
| KR | 10-1997-0002776 | 1/1997 |
| KR | 10-2002-0008457 | 1/2002 |
| WO | 99/05493 | 2/1999 |
| WO | 2011/050227 | 4/2011 |

OTHER PUBLICATIONS

International Search Report for International Application No. PCT/US2010/025248 issued by the Korean Intellectual Property Office on Oct. 11, 2011.
International Search Report for International Application No. PCT/US2010/053659 issued by the Korean Intellectual Property Office on Aug. 2, 2011.
International Search Report for International Application No. PCT/US2010/053763 issued by the Korean Intellectual Property Office on Jul. 28, 2011.
International Search Report for International Application No. PCT/US2011/024465 issued by the Korean Intellectual Property Office on Oct. 27, 2011.
International Search Report for International Application No. PCT/US2011/025206 issued by the Korean Intellectual Property Office on Oct. 17, 2011.
International Search Report for International Application No. PCT/US2012/022356 issued by the Korean Intellectual Property Office on Sep. 3, 2012.
International Search Report for International Application No. PCT/US2012/028224 issued by the Korean Intellectual Property Office on Sep. 24, 2012.
1st Office Action dated May 31, 2013 issued by the State Intellectual Property Office (SIPO) of the People's Republic of China for Chinese Patent Application No. 20180047796.6.
3rd Office Action dated Aug. 8, 2014 issued by the State Intellectual Property Office (SIPO) of the People's Republic of China for Chinese Patent Application No. 201080047796.6.

* cited by examiner

FIBER OPTIC TRANSDUCERS, FIBER OPTIC ACCELEROMETERS AND FIBER OPTIC SENSING SYSTEMS

RELATED APPLICATION

This application claims the benefit of priority to U.S. Provisional Patent Application Ser. No. 61/279,607, filed on Oct. 23, 2009, the contents of which are incorporated in this application by reference.

TECHNICAL FIELD

This invention relates generally to the field of fiber optic sensing systems, and more particularly, to improved fiber optic transducers, accelerometers, interferometers, and improved fiber optic sensing systems.

BACKGROUND OF THE INVENTION

Fiber optic sensing systems are widely used for sensing disturbances (e.g., motion, acceleration, sound, etc.). Such fiber optic sensing systems often include a transducer for converting the disturbance into a phase change of light in an optical fiber.

Such transducers suffer from a number of deficiencies. For example, certain fiber optic sensing applications have spatial restrictions which limit the applicability of certain transducer designs. Further, the environment in which the transducers (and other optical elements of the fiber optic sensing systems) are used may require sensitivity and control not obtained or available from many conventional transducers. Further still, the operation of many optical transducers is adversely affected by disturbances along differing axes of motion.

Thus, it would be desirable to provide improved optical transducers, fiber optic accelerometers, and related fiber optic sensing systems to address these and other issues.

BRIEF SUMMARY OF THE INVENTION

According to an exemplary embodiment of the present invention, a transducer is provided. The transducer includes a fixed portion configured to be secured to a body of interest, a moveable portion having a range of motion with respect to the fixed portion, a spring positioned between the fixed portion and the moveable portion, and a length of fiber wound between the fixed portion and the moveable portion. The length of fiber spans the spring. The transducer also includes a mass engaged with the moveable portion. The transducer may be included as part of an accelerometer. The transducer/ accelerometer may include various additional features that are not mutually exclusive with respect to one another. For example, the mass may be configured to envelope the moveable portion (as well as other portions of the transducer). Further, the mass may house certain optical elements (e.g., a reflector, a fiber optic coupler, etc.) of the accelerometer. Further still, certain of the elements of the transducer (e.g., the fixed portion, the moveable portion, and the spring) may be formed from a unitary piece of material.

The inventive transducers (and inventive accelerometers) may be incorporated into fiber optic sensing systems having additional optical elements. Exemplary fiber optic sensing systems include Sagnac interferometer sensing systems, Michelsen interferometer sensing systems, and Fabry Perot interferometer sensing systems.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity purposes. Included in the drawings are the following figures.

DETAILED DESCRIPTION OF THE INVENTION

The invention relates generally to transducers, accelerometers (i.e., interferometers), and fiber optic sensing systems for sensing physical disturbances (e.g., motion, acceleration, perturbations, etc.) of a body of interest. As will be appreciated by those skilled in the art, a fiber optic accelerometer (sometimes referred to as a fiber optic sensor or a fiber optic interferometer) is an element of a system for measuring physical motion of a body of interest using fiber optic technology. The accelerometer includes a transducer that converts a physical disturbance of the body of interest into a change in strain applied to a length of optical fiber of the transducer.

Figure 1:
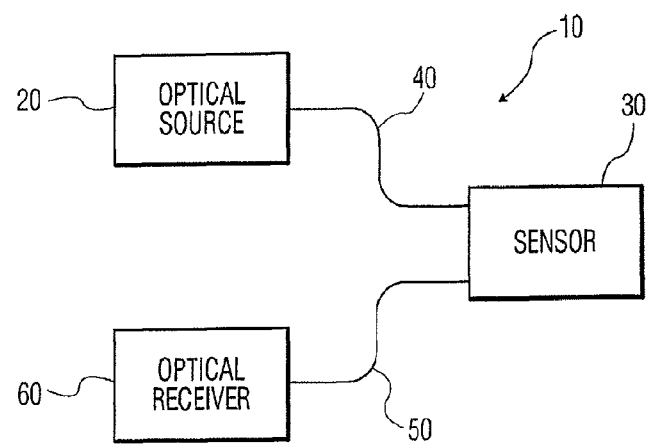
FIG. 1 is a block diagram illustration of a fiber optic accelerometer in accordance with an exemplary embodiment of the present invention.

Referring to FIG. 1, fiber optic accelerometer 10 includes optical source 20 (e.g., an LED, an SLED, a laser, etc.), sensor 30 (e.g., an interferometer), optical receiver 60 (e.g., an optical detector such as a photodetector), optical fiber 40 for transmitting light from optical source 20 to sensor 30, and optical fiber 50 for returning light from sensor 30 to receiver 60. Sensor 30 includes a transducer which converts mechanical or physical motion (such as acceleration) to a change in the strain (e.g., longitudinal strain) in an optical fiber. Sensor 30 also includes other optical elements for converting the change in strain to a change in the phase of light that passes through the optical fiber 40, 50. FIGS. 2A-2H illustrate various transducers which may be included in sensor 30 of FIG. 1.

Figure 2A:
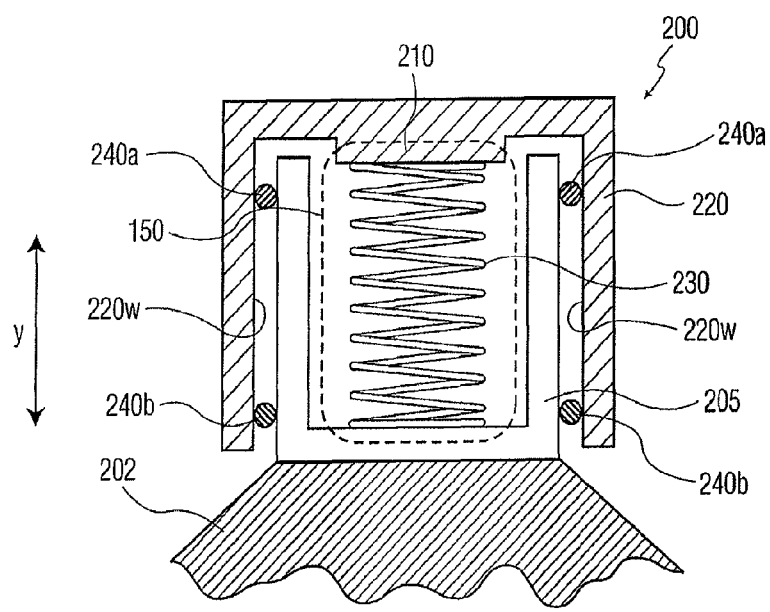
FIGS. 2A-2H are cross-sectional block diagram views of transducers in accordance with various exemplary embodiments of the present invention.

FIG. 2A illustrates transducer 200 including fixed portion/mandrel 205 and moveable portion/mandrel 210 separated by spring 230. Optical fiber 150 (illustrated as a dashed box between mandrels 205, 210) is wound around fixed mandrel 200 and moveable mandrel 210, where spring 230 applies a biasing tension to optical fiber 150 (e.g., with an example tension of the wound length of optical fiber 150 being approximately between 0.1-4.0 newtons). Optical fiber 150 may be fixed to mandrels 205, 210 at the ends of the wound portion using an adhesive (not shown) if desired (e.g., epoxy, acrylate adhesive, etc.). Mass 220 is secured to moveable mandrel 210 (e.g., using fasteners such as screws, using a rigid adhesive, etc.). Alternatively, mass 220 and moveable mandrel 210 may be formed from a unitary piece of material. Example materials of mandrels 205, 210 (and mass 220) are metals (e.g., aluminum, stainless steel, brass, etc.) and plastics (e.g., polycarbonate). Hinges 240a, 240b (which are provided between fixed mandrel 205 and mass 220) limit the range of motion of moveable mandrel 210 (and mass 220) to a direction substantially along axis labeled as axis "Y", where axis "Y" is a single linear degree of freedom that is substantially parallel to interior wall portion 220w of enveloping mass 220 (and is substantially parallel to an imaginary line connecting mandrels 205 and 210). The exemplary hinges 240a, 240b shown in the cross-sectional view of FIG. 2A are circular hinges similar in function to hinge 210n described below with respect to FIG. 5.

Fixed mandrel 205 is rigidly attached to body of interest 202, or may be rigidly attached to body of interest 202 through a base plate or other structure (not shown). When body of interest 202 undergoes acceleration (or other physical disturbance) in space, the result is relative motion between fixed mandrel 205 and moveable mandrel 210/mass 220. This relative motion changes the longitudinal strain within optical fiber 150. As provided above, this change in the longitudinal strain in optical fiber 150 is converted to a change in the phase of light as the light passes through optical fiber 150.

In transducer 200 shown FIG. 2A (and in various other exemplary transducers such as those shown in FIGS. 2B-2E and FIGS. 2G-2H), mass 220 envelopes at least one of fixed mandrel 205, spring 230, and/or the wound length of fiber 150 within at least one position (or within every position) within the range of motion of moveable portion 210. That is, mass 220 has a substantially cylindrical shape where inner side walls 220w of the cylindrical shape surround (i.e., envelope) at least one of fixed mandrel 205, spring 230, and/or the wound length of fiber 150. By enveloping such elements with mass 220, various benefits are provided. For example, the mass provided per volume of the transducer is relatively high because of the enveloping shape of mass 220. Further, the enveloping shape assists in controlling the center of gravity of the mass 220. Further still, the enveloping shape of the mass 220 reduces sensitivity to off-axis excitation. The features and details described above with respect to FIG. 2A are applicable to the exemplary embodiments shown in FIGS. 2B-2H unless indicated otherwise.

Figure 2B:
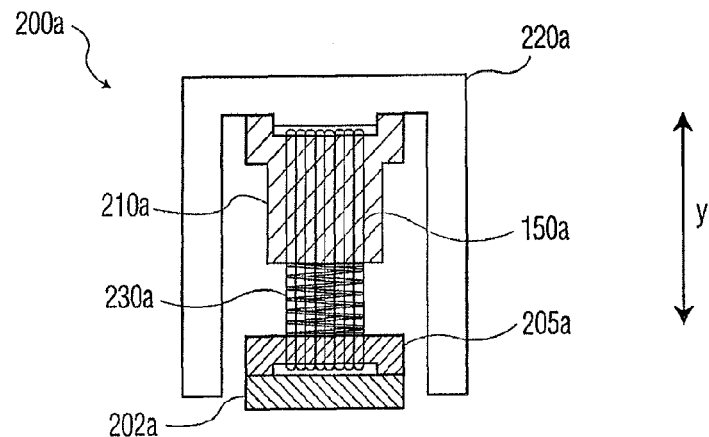

FIG. 2B illustrates transducer 200a including fixed mandrel 205a, moveable mandrel 210a, and spring 230a separating mandrels 205a, 210a. Optical fiber 150a is wound around fixed mandrel 205a and the moveable mandrel 210a. Mass 220a is secured to moveable mandrel 210a, or alternatively, mass 220a, and moveable mandrel 210a may be formed from a unitary piece of material. Fixed mandrel 205a is rigidly attached to body of interest 202a, or may be rigidly attached to body of interest 202a through a base plate or the like. When body of interest 202a undergoes acceleration (or another physical disturbance) in space, the result is relative motion between fixed mandrel 205a and moveable mandrel 210a/mass 220a. This relative motion changes the longitudinal strain within optical fiber 150a, where such longitudinal strain in optical fiber 150a is converted to a change in the phase of light as the light passes through optical fiber 150a. FIG. 2B differs from FIG. 2A primarily in terms of the shape of certain of the elements; however, the function of the elements is substantially the same.

Figure 2C:
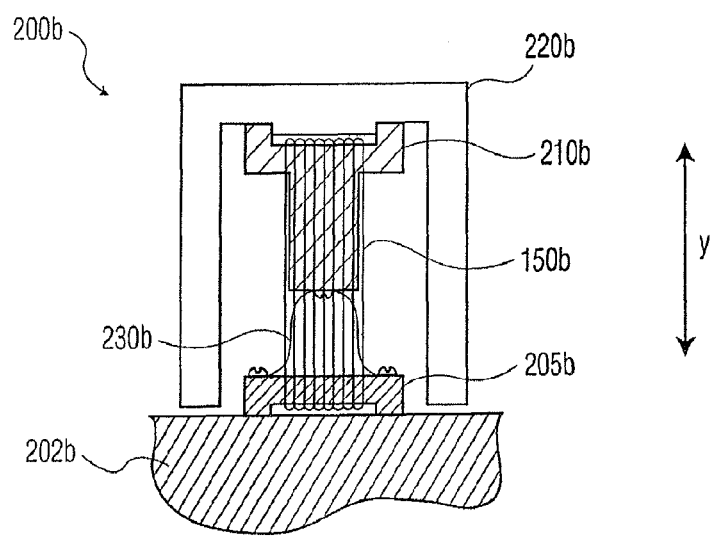

FIG. 2C is substantially similar to FIG. 2B, except that the elements illustrated have reference numerals ending with "b" instead of "a". The primary difference between FIG. 2C and FIG. 2B is that in FIG. 2C spring 230b is a bent sheet metal spring (as opposed to the coil compression style spring shown in FIG. 2B) that can also provide a hinge function, similar to hinges 240a, 240b described above with respect to FIG. 2A, as well as a biasing spring function. Of course, other types of spring members are contemplated.

Figure 2D:
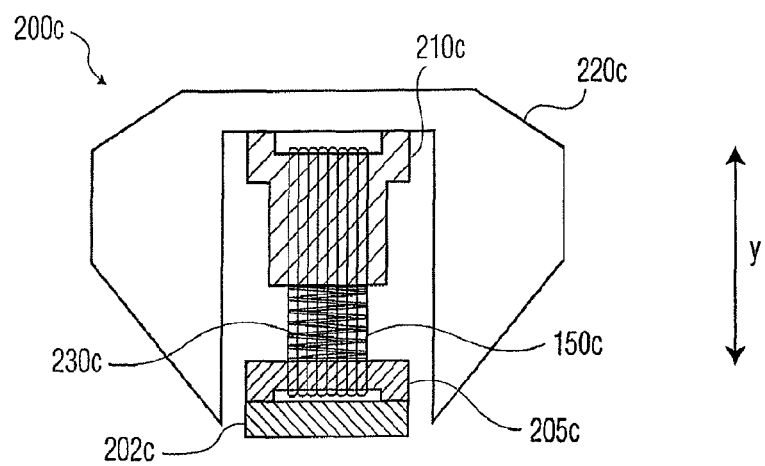
Figure 2E:
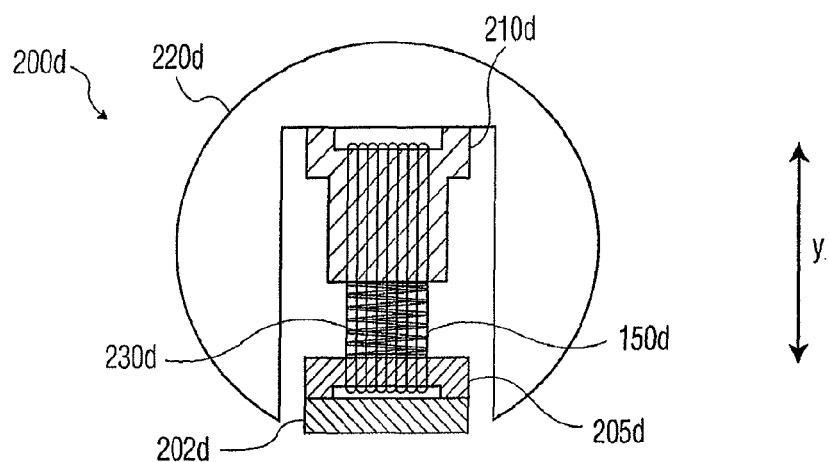

As will be appreciated by those skilled in the art, the mass does not need to be a cylindrical enveloping mass as shown in FIGS. 2A-2C, that is, other shapes are contemplated. FIGS. 2D-2E are substantially similar to FIG. 2B, except that the elements illustrated have reference numerals ending with "c"/"d" instead of "a"; however, the shapes of the enveloping mass 220c and 220d is varied in FIGS. 2D-2E. In FIG. 2D, enveloping mass 220c has a biconical shape (as opposed to a cylindrical shape as in FIG. 2B). In FIG. 2E, enveloping mass 220d has a spherical shape. As with mass 220 (described above in connection with FIG. 2A), mass 220c/220d envelopes other portions of the transducer within the range of motion (or at least one position within the range of motion) of the moveable portion of the transducer, as desired. Other exemplary shapes of the enveloping mass include a conical shape, a rhombic shape, amongst others.

Figure 2F:
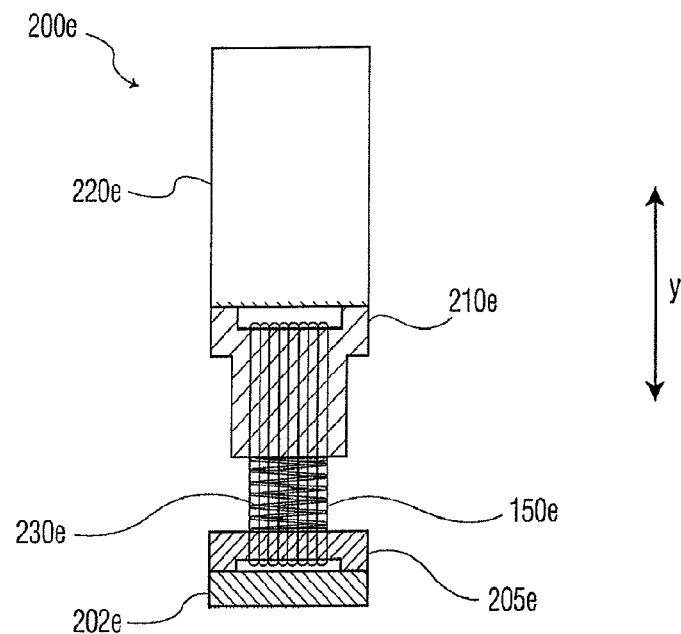

As will be appreciated by those skilled in the art, each of the transducers illustrated in FIGS. 2A-2H may be included in an optical interferometer (also referred to as a "sensor"). Such an optical interferometer includes optical elements that perform functions including the conversion of the change in the phase of light passing through the fiber in the transducer to a change in optical intensity. According to certain exemplary embodiments of the present invention, certain of these optical elements may be provided within the mass secured to (or integrated with) the moveable mandrel. FIG. 2F is substantially similar to FIG. 2B, except that the elements illustrated have reference numerals ending with "e" instead of "a", and that the mass 220e has a different shape (and an additional function) as compared to mass 220a. Mass 220e extends above moveable mandrel 210e at a terminal end of the transducer (and in certain embodiments, a terminal end of the accelerometer). Mass 220e defines a volume configured to house at least one optical element of the accelerometer. Exemplary optical elements that may be housed within mass 220e include a fiber optic coupler, a reflector, an optical source (e.g., a light source), an optical receiver/detector, an optical depolarizer, a delay coil of optical cable, and a phase modulator. Any portion of these elements, and/or additional elements, may be housed within mass 220e as is desired in the given application. Of course, the shape of mass 220e illustrated in FIG. 2F is exemplary in nature—other shapes are contemplated. Further, while mass 220e is not illustrated as an "enveloping" mass as described above, the present application contemplates a mass combining the features of housing optical elements as well as including the enveloping feature described above.

Figure 2G:
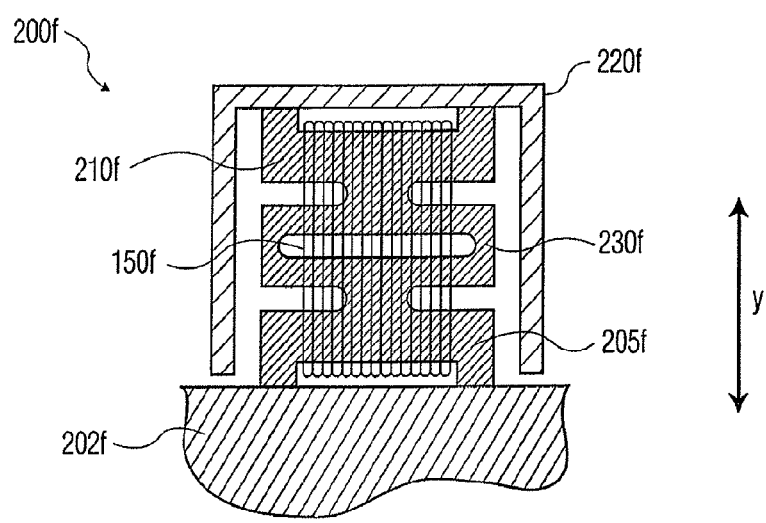

FIG. 2G illustrates transducer 200f where each of fixed mandrel 205f, spring 230f, and moveable mandrel 210f are formed from a unitary piece of material. Enveloping mass 220f may be secured to moveable mandrel 210f, or mass 220f may be included in the unitary piece of material with moveable mandrel 210f. As with the previously described embodiments, fixed mandrel 205f is rigidly attached to body of interest 202f, or may be rigidly attached to body of interest 202f through a base plate or the like. A length of optical fiber 150f is wound around fixed mandrel 205f and the moveable mandrel 210f. Otherwise, the function of transducer 200f is substantially similar to that described above with respect to FIG. 2A.

Figure 2H:
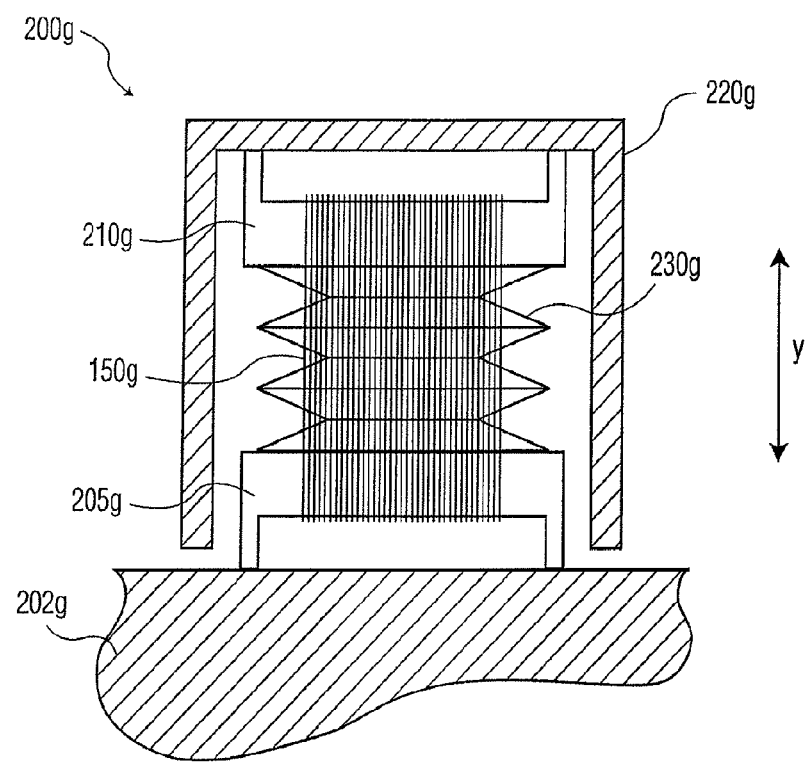

FIG. 2H is substantially similar to FIG. 2B, except that the elements illustrated have reference numerals ending with "g" instead of "a". The primary difference between FIG. 2H and FIG. 2B is that in FIG. 2H the spring function is provided by compressive bellows element 230g. Element 230g may have a hollow circular cross section, and may be defined by one or more metallic sub-elements, arranged to provide a spring function, but also creating lateral (and/or) torsional stiffness, as is well known by those skilled in the art.

Figure 2I:
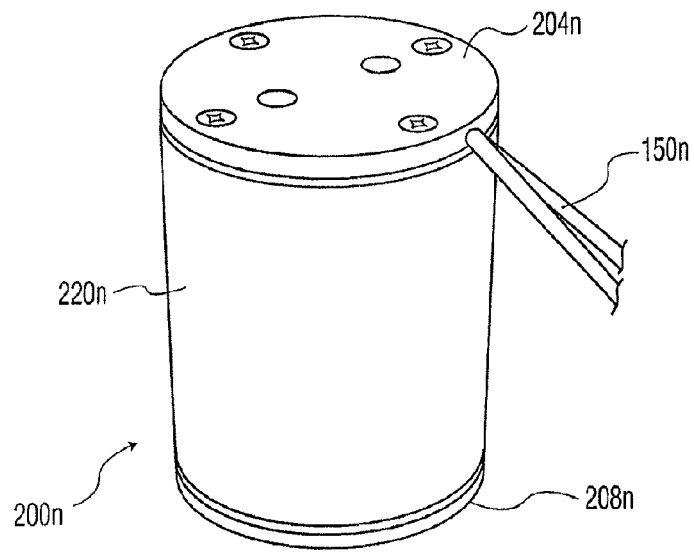
FIGS. 2I-2J are top and bottom perspective views of a transducer in accordance with an exemplary embodiment of the present invention.
Figure 2J:
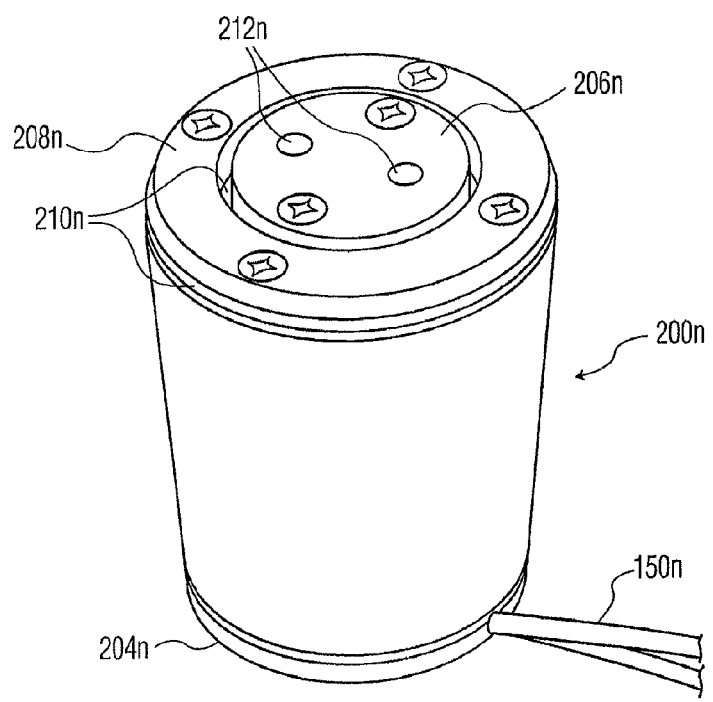

FIGS. 2I-2J are top and bottom perspective views of a transducer such as that shown in FIGS. 2A-2H, excluding obvious distinctions such as the shape of the enveloping mass 220. Each of FIGS. 2A-2H includes a length of optical fiber (e.g., length of fiber 150, 150a, 150b, etc.) wound between the fixed mandrel and the moveable mandrel; however, none of FIGS. 2A-2H illustrates the fiber entering (or exiting) the transducer. That is, in FIGS. 2A-2H only that portion of the fiber wound between the fixed mandrel and the moveable mandrel is shown. FIGS. 2I-2J illustrate fiber 150n entering (and exiting) transducer 200n. Transducer 200n includes top plate 204n secured to enveloping mass 220n and the moveable mandrel. Top plate 204n is also secured to a moveable mandrel (not visible in FIGS. 2I-2J). Transducer 200n also includes mounting plate 206n, bottom plate 208n (e.g., a retaining ring), and circular hinge 210n. Bottom plate 208n is used to secure circular hinge 210n to mass 220n. Mounting plate 206n secures the inner region of circular hinge 210n to a fixed mandrel (not visible in FIGS. 2I-2J). Mounting plate 206n may also be used to secure transducer 200n to a body of interest (or to an interposing structure) through mounting holes 212n. Additional features of transducer 200n will be described below in connection with the exploded view provided in FIG. 5.

Figure 3A:
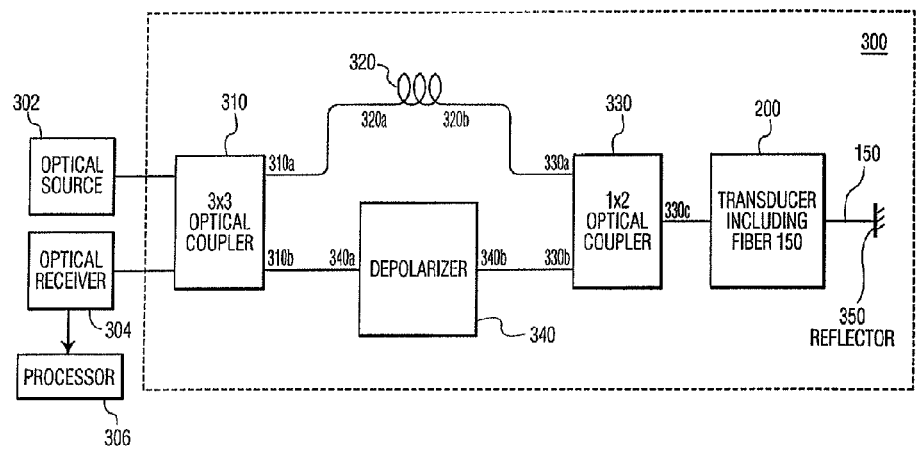
FIG. 3A is a block diagram view of a linearized Sagnac interferometer in accordance with an exemplary embodiment of the present invention.
Figure 3B:
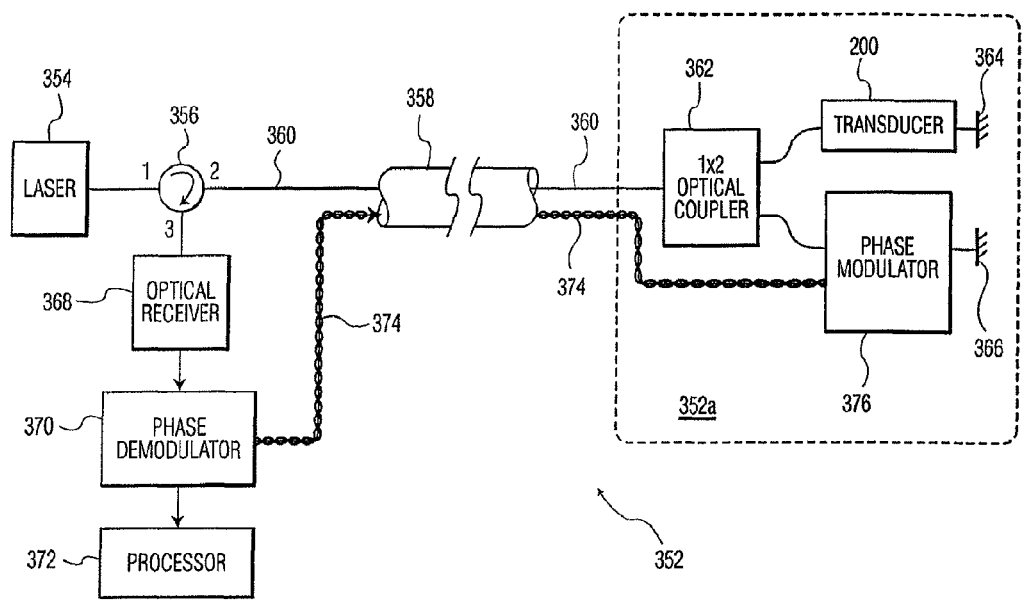
FIGS. 3B-3C are block diagram views of Michelsen interferometers in accordance with various exemplary embodiments of the present invention.
Figure 3C:
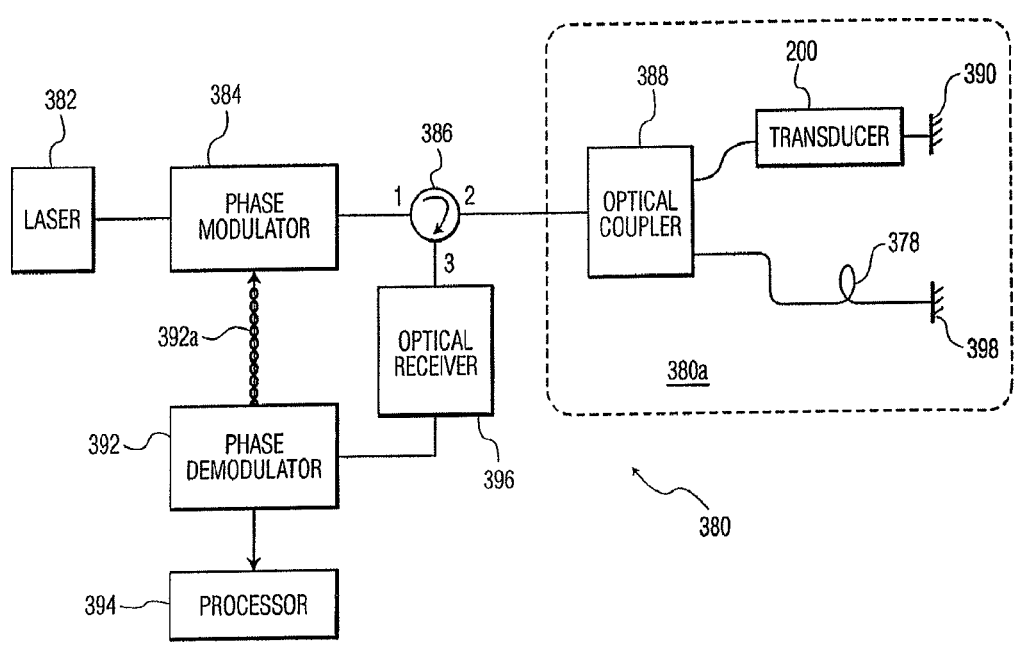
Figure 4A:
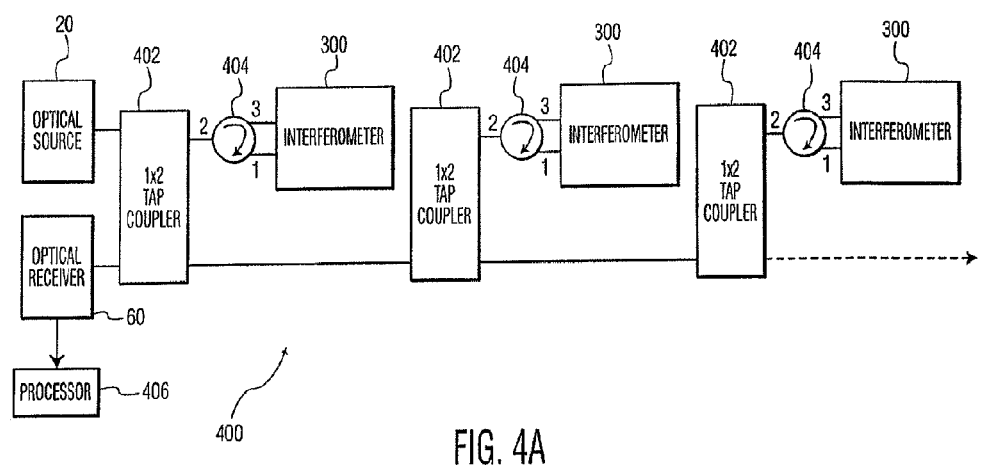
FIG. 4A is a block diagram view of a plurality of multiplexed Sagnac interferometers in accordance with an exemplary embodiment of the present invention.
Figure 4B:
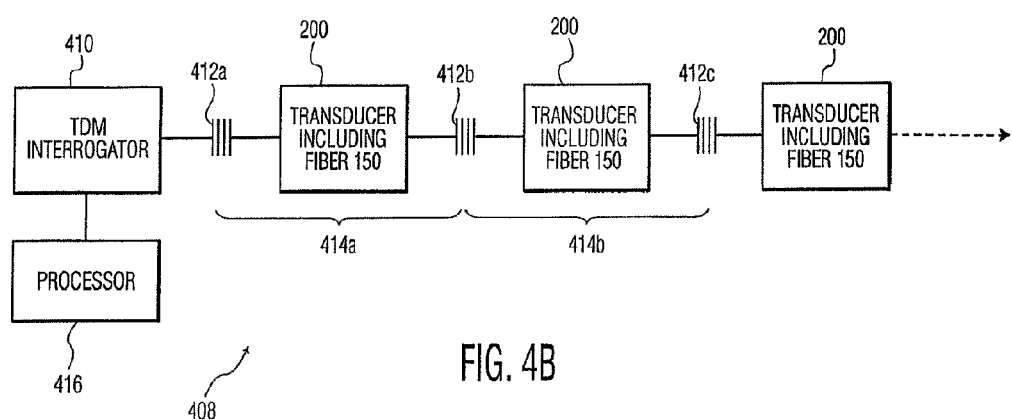
FIG. 4B is a block diagram view of a plurality of multiplexed Fabry Perot interferometers in accordance with an exemplary embodiment of the present invention.

As provided above, a transducer may be included as part of an interferometer, where the interferometer converts a change in the optical phase of light propagating along the optical fiber 150 within the transducer to a change in the optical intensity of the light leaving the interferometer. Transducers according to the present invention may be utilized in connection with any of a number of types of sensors/interferometers, and may be used in any of a number of varied applications. Exemplary sensors/applications for the transducers include fiber optic sensing systems. Exemplary fiber optic sensing systems include Sagnac interferometer sensing systems, Michelsen interferometer sensing systems, Fabry Perot interferometer sensing systems, and Mach-Zender interferometer sensing systems. FIG. 3A illustrates a linearized Sagnac sensing system including a single sensor, where such a Sagnac interferometer may be desirable because of a relatively small size and low cost. FIGS. 3B-3C illustrate Michelsen sensing systems, each including a single sensor. FIG. 4A illustrates a multiplexed Sagnac sensing system including a plurality of sensors. FIG. 4B illustrates a multiplexed Fabry Perot sensing system including a plurality of sensors.

Referring specifically to FIG. 3A, a fiber optic sensing system includes interferometer 300 (i.e., sensor 300, which is a linearized Sagnac interferometer) as well as optical source 302 and optical receiver 304. Interferometer 300 includes optical coupler 310 (e.g., a 3×3 optical coupler) for receiving an optical signal (e.g., light) from optical source 302, and for transmitting the optical signal out of interferometer 300 to optical receiver 304. First output lead 310a of optical coupler 310 is connected to input lead 320a of delay coil 320. Output lead 320b of delay coil 320 is connected to first input lead 330a of optical coupler 330 (e.g., a 1×2 fiber optic coupler 330). Second output lead 310b of optical coupler 310 is connected to input lead 340a of depolarizer 340. The third input lead of optical coupler 310 is not shown (as its end is tied off and/or crushed to minimize light that is reflected back into optical coupler 310). Depolarizer 340 significantly reduces polarization-induced signal fading allowing inexpensive single mode fiber to be used for all of the optical components and cable fibers rather than costly polarization-maintaining fiber. Depolarizer 340 may be one of several commercially available depolarizers, such as, for example, a recirculating coupler (single or multiple stage) or a Lyot Depolarizer. Output lead 340b of depolarizer 340 is connected to input lead 330b of optical coupler 330. First output lead 330c of optical coupler 330 enters into transducer 200 (e.g., which may be any of the transducers illustrated or described within the present application) through optical fiber 150. Optical fiber 150 is wrapped (e.g., a desired number of turns) between the fixed mandrel and the moveable mandrel (described above), and the distal end of optical fiber 150 terminates at reflector 350 (e.g., broadband reflector 350). As will be appreciated by those skilled in the art, physical disturbances of the body of interest cause small changes in the length of fiber 150. These changes cause non-reciprocal changes in the phase of the light travelling through the Sagnac interferometer, and the interferometer converts the phase change of the light into an intensity change by allowing coherent interference between the light traveling in two counterpropagating directions, recombining at the optical coupler 330. This intensity change in the light is transmitted to optical receiver 304, where such intensity change is interpreted as motion/acceleration/disturbance of the body of interest by processor 306 connected to optical receiver 304.

FIGS. 3B-3C illustrate Michelsen interferometer fiber optic sensing systems 352, 380. System 352 illustrated in FIG. 3B includes internal modulation at sensor 352a, while system 380 illustrated at FIG. 3B includes external modulation (i.e., external of sensor 380a).

Referring specifically to FIG. 3B, optical source 354 (e.g., a laser) transmits an optical signal (e.g., laser light) to optical circulator 356. As will be appreciated by those skilled in the art, optical circulator 356 allows optical signals to pass only from port 1 to port 2, and from port 2 to port 3. The optical signal generated from laser 354 follows from port 1 to port 2, and along fiber length 360 within lead cable 358. Upon exiting optical coupler 362 (e.g., a 1×2 optical coupler) the optical signal is split between transducer 200 (e.g., which may be any of the transducers illustrated or described within the present application) and phase modulator 376. As will be appreciated by those skilled in the art, phase modulator 376 may include a reference coil. The split optical signals pass through the fiber within transducer 200 (including wound fiber length 150) and pass through phase modulator 376 and then reflect at reflectors 364, 366. Reflectors may be, for example, Faraday rotator mirrors. The reflected optical signals recombine (coherently) at optical coupler 362 and transmit back along fiber 360 within lead cable 358 to port 2 of optical circulator 356. From port 2 the recombined signal follows to port 3 of optical circulator 356, and then to optical receiver 368 (e.g., a photodetector or other optical detector). This recombined signal (which has a change in optical intensity which can be correlated to a disturbance of a body of interest) is converted at optical receiver 368 to electron hole pairs received by phase demodulator 370. Phase demodulator communicates with processor 372 for determination of the desired information related to the physical disturbance of the body of interest. As will be appreciated by those skilled in the art, phase demodulator 370 may generate a phase modulation drive signal (e.g., a carrier voltage drive signal) along wire 374 to phase modulator 376. That is, the power to control phase modulator 376 is carried along wire 374 (e.g., twisted copper wires 374).

FIG. 3C illustrates optical source 382 (e.g., a laser) that transmits an optical signal (e.g., laser light) to external phase modulator 384. The optical signal exiting phase modulator enters port 1 of optical circulator 386 and exits through port 2. From port 2 the optical signal enters optical coupler 388 of sensor 380a where the optical signal is split. That is, the optical signal is split between transducer 200 (e.g., which may be any of the transducers illustrated or described within the present application) and reference coil 378. The split optical signals pass through the fiber within transducer 200 (including wound fiber length 150) and through reference coil 378 and then the optical signals reflect at reflectors 390, 398. Reflectors 390, 398 may be, for example, Faraday rotator mirrors. The reflected optical signals recombine coherently at optical coupler 388 and transmit back along fiber optic cable to port 2 of optical circulator 386. From port 2 the recombined signal follows to port 3 of optical circulator 386, and then to optical receiver 396 (e.g., a photodetector or other optical detector). This recombined signal (which has a change in optical intensity which can be correlated to a disturbance of a body of interest) is converted at optical receiver 396 to electron hole pairs received by phase demodulator 392. Phase demodulator communicates with processor 394 for determination of the desired information related to the disturbance of the body of interest. As will be appreciated by those skilled in the art, phase demodulator may generate a phase modulation drive signal (e.g., a carrier voltage drive signal) along wire 392a (e.g., a twisted copper wire) to phase modulator 384.

As provided above, each of the exemplary fiber optic sensing systems of FIGS. 3A-3C includes a single sensor. Of course, it is often desirable to have fiber optic sensing systems with multiple sensors, for example, for sensing disturbances within a large area (and/or along a relatively long length). FIGS. 4A-4B illustrate fiber optic sensing systems including a plurality of sensors.

Referring specifically to FIG. 4A, a plurality of linearized Sagnac interferometers (e.g., interferometer 300 from FIG. 3A) are included in fiber optic sensing system 400. System 400 includes optical source 20, and optical receiver 60. Optical source 20 generates an optical signal in a pulsed mode with optical couplers 402 (e.g., 1×2 tap couplers 402) upstream of each interferometer 300, through optical circulator 404, to allow time division multiplexed operation, wherein return pulses from each interferometer 300 are received at optical receiver 60 at a different time. That is, tap couplers 402 are used to split the optical signal (e.g., the source light intensity) among several interferometers/sensors. The optical signal is pulsed, and return signals from each interferometer 300 return to optical receiver 60 at different times, but in their respective order of location. The return signals include intensity information proportional to the disturbance measured by each interferometer 300, where the information is processed by processor 406.

FIG. 4B illustrates fiber optic sensing system 408 including TDM (time division multiplexing) interrogator 410 for generating an optical signal. In this exemplary configuration, FBGs (i.e., fiber bragg gratings) are provided on each side of each transducer 200. Each transducer, and its surrounding FBGS, may be considered an interferometer 414a, 414b, etc. Each of FBGs 412a, 412b, 412c, etc. act as partial reflectors. Interrogator 410 (which typically includes an optical source, a phase modulator, a light pulser, an optical receiver, and a phase demodulator) initiates an optical signal pulse that is partially reflected by each FBG 412a, 412b, 412c, etc. Light reflected at pairs of each FBG 412a, 412b, 412c, etc. is combined coherently. The combined signals arrive in time order such that TDM interrogator 410 (in connection with processor 416) can determine the light intensity change that results from the disturbance at each transducer 200.

Figure 5:
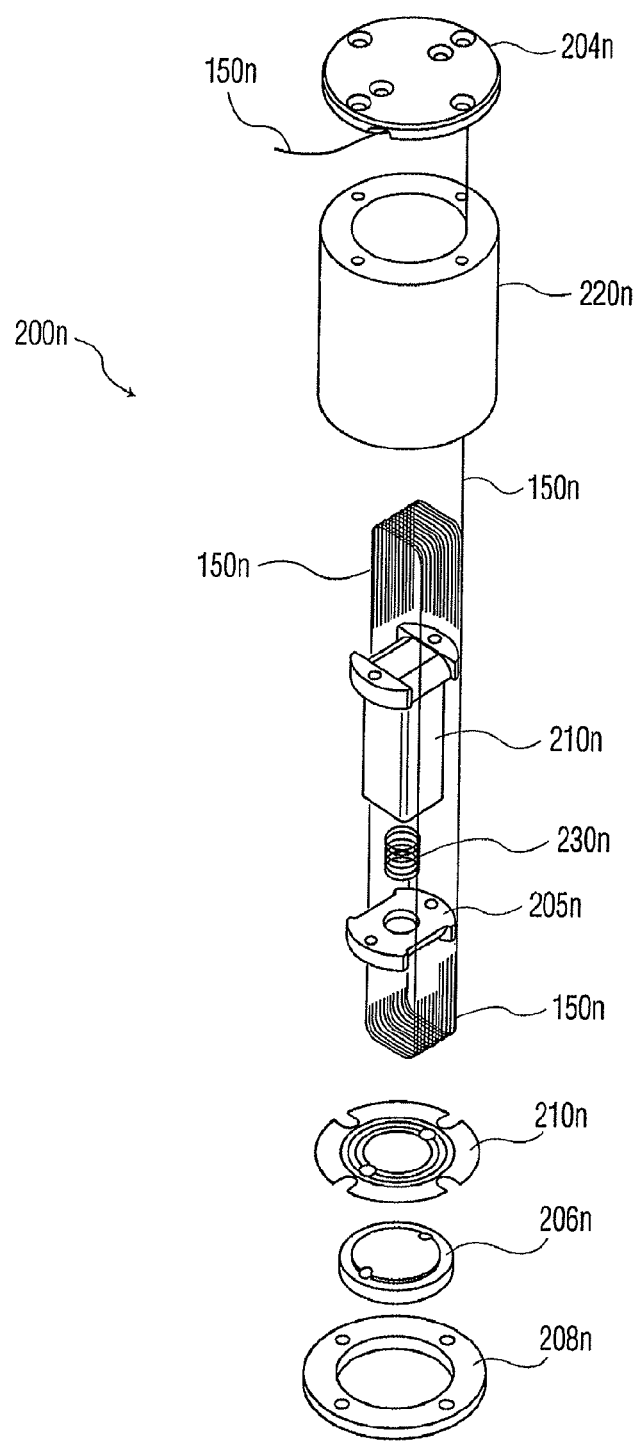
FIG. 5 is an exploded view of a transducer in accordance with an exemplary embodiment of the present invention.

FIG. 5 is an exploded view of transducer 200n (previously described in connection with FIGS. 2I-2J). FIG. 5 illustrates fiber 150n entering (and exiting) transducer 200n at the same point adjacent to top plate 204n. Top plate 204n is secured to enveloping mass 220n. Fiber 150n is wound between moveable mandrel 210n and fixed mandrel 205n. Top plate 204n is secured to moveable mandrel 210n, and as such, enveloping mass 220n is also secured to moveable mandrel 210n through top plate 204n. Biasing spring 230n is disposed between fixed mandrel 205n and moveable mandrel 210n. Bottom plate 208n secures circular hinge 210n to mass 220n. Mounting plate 206n secures the inner region of circular hinge 210n to fixed mandrel 205n. As provided above, mounting plate 206n may also be used to secure transducer 200n to a body of interest (or to an interposing structure, not shown).

Figure 6A:
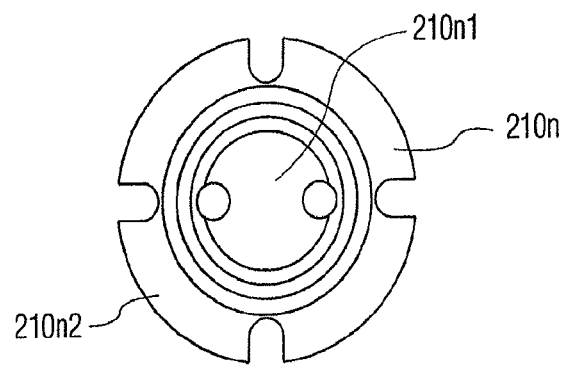
FIGS. 6A-6B are top and perspective views of a hinge of the transducer of FIG. 5.
Figure 6B:
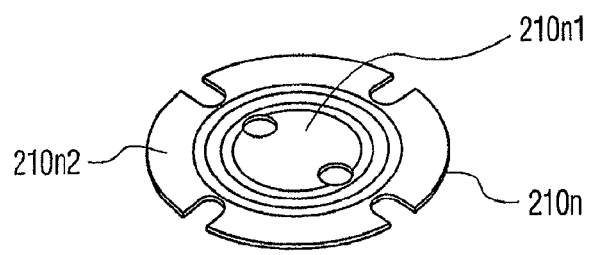
Figure 6C:
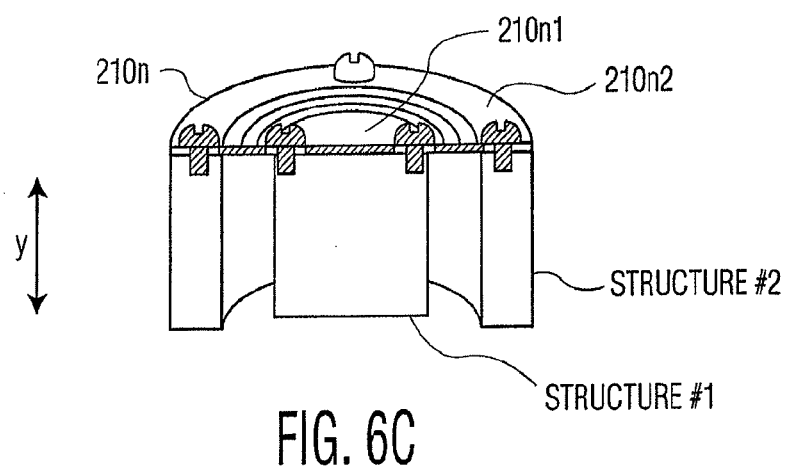
FIG. 6C illustrates exemplary mounting of the hinge of FIGS. 6A-6B.

Circular hinge 210n limits movement between objects attached to its inner diameter (in FIG. 5, fixed mandrel 205n is configured to be attached to the inner diameter of hinge 210n) and its outer diameter (in FIG. 5, mass 220n is configured to be attached to the outer diameter of hinge 210n). More specifically, circular hinge 210n substantially limits relative motion between mass 220n (secured to circular hinge 210n) and fixed mandrel 205n to substantially linear motion. Such linear motion may be along the "Y" axis described above with respect to FIGS. 2A-2H. FIGS. 6A-6B illustrate inner diameter 210n1 and outer diameter 210n2 of circular hinge 210n. FIG. 6C illustrates inner diameter 210n1 secured to Structure #1, and outer diameter 210n2 secured to Structure #2.

Figure 7A:
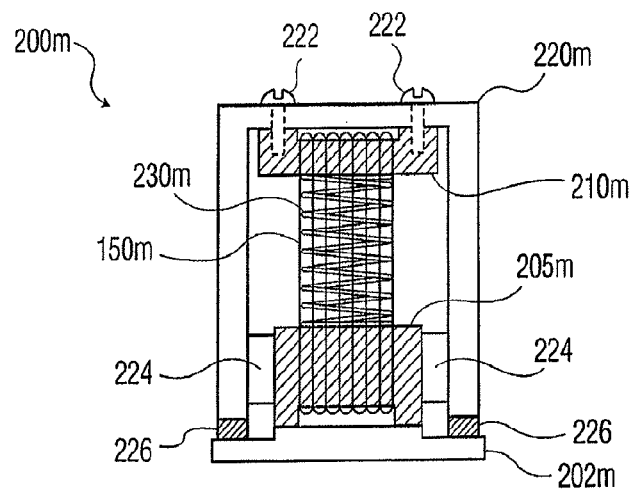
FIG. 7A is a sectional block diagram view of a transducer in accordance with an exemplary embodiment of the present invention.
Figure 7B:
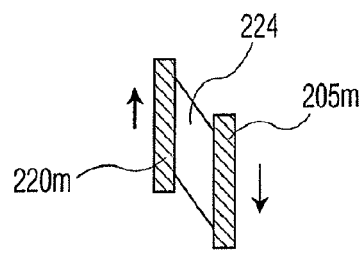
FIGS. 7B-7C are block diagram views of damping modes of the transducer of FIG. 7A.
Figure 7C:
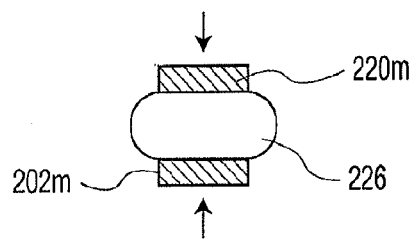

In certain transducers according to the present invention, it may be desirable to provide for "damping" such as elastomeric damping, fluid damping, etc. That is, it is often desirable to reduce the quality factor of a transducer resonance peak by absorbing energy in the form of heat. Damping may also be used to increase the sensitivity of a transducer below its resonant frequency. FIG. 7A illustrates transducer 200m (similar in most respects to transducer 200a in FIG. 2B, except that the reference letter "a" has been replaced with reference letter "m"). A difference in transducer 200m is the inclusion of elastomeric shear damping elements 224 and elastomeric compression damping elements 226. As shown in FIG. 7A, damping elements 224 are disposed between fixed mandrel 205m and mass 220m. Further, damping elements 226 are provided between mass 220m and body of interest 202m. FIG. 7B conceptually illustrates shear damping between mass 220m and fixed mandrel 205m, while FIG. 7C conceptually illustrates compression damping between mass 220m and body of interest 202m. Such damping techniques may be applied to each of the transducers illustrated and described in the present application.

Exemplary applications for the transducers, accelerometers, and fiber optic sensing systems of the present invention include vertical seismic profiling (VSP), three dimensional sub-surface mapping, microseismic monitoring, machine vibration monitoring, civil structure (e.g., dams, bridges, levees, buildings, etc.) monitoring, tunnel detection, perimeter/border security, earthquake monitoring, borehole leak detection, roadbed erosion, railbed erosion, amongst others.

Although various exemplary transducers of the present invention are described in connection with a fixed mandrel rigidly attached to a body of interest (or rigidly attached to the body of interest through a base plate or other structure) it is not limited thereto. For example, rather than such a rigid attachment, the fixed portion may be magnetized (or include a magnetized portion) such that the fixed portion may be secured to the body of interest, where the body of interest includes a ferrous material.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A transducer comprising:
   a fixed portion configured to be secured to a body of interest;
   a moveable portion having a range of motion with respect to the fixed portion;
   a spring positioned between the fixed portion and the moveable portion;
   a length of fiber wound around the fixed portion and the moveable portion, the length of fiber spanning the spring; and
   a mass engaged with the moveable portion such that the mass moves with the moveable portion, wherein the mass envelopes at least two sides of the moveable portion.

2. The transducer of claim 1 wherein the mass also envelopes at least one of the fixed portion, the spring, and the length of fiber within at least one position within the range of motion of the moveable portion.

3. The transducer of claim 1 wherein the mass envelopes the fixed portion within at least one position within the range of motion of the moveable portion.

4. The transducer of claim 1 wherein the mass envelopes the spring within at least one position within the range of motion of the moveable portion.

5. The transducer of claim 1 wherein the mass envelopes the length of fiber within at least one position within the range of motion of the moveable portion.

6. The transducer of claim 1 wherein the mass envelopes each of the fixed portion, the spring, and the length of fiber within at least one position within the range of motion of the moveable portion.

7. The transducer of claim 1 wherein the mass envelopes at least one of the fixed portion, the spring, and the length of fiber within the entire range of motion of the moveable portion.

8. The transducer of claim 1 wherein the mass envelopes the fixed portion within the entire range of motion of the moveable portion.

9. The transducer of claim 1 wherein the mass envelopes the spring within at least one position within the entire range of motion of the moveable portion.

10. The transducer of claim 1 wherein the mass envelopes the length of fiber within at least one position within the entire range of motion of the moveable portion.

11. The transducer of claim 1 wherein the mass envelopes each of the fixed portion, the spring, and the length of fiber within the entire range of motion of the moveable portion.

12. The transducer of claim 1 wherein the spring is a biasing spring for providing tension to the length of fiber.

13. The transducer of claim 1 further comprising a hinge connected between the mass and the fixed portion to limit the range of motion of the moveable portion to a single linear degree of freedom.

14. The transducer of claim 13 wherein the range of motion extends along an axis substantially parallel to an interior wall portion of the mass.

15. The transducer of claim 1 wherein the mass and the moveable portion are integrated into a single piece of material.

16. The transducer of claim 1 wherein the mass and the moveable portion are separate structures affixed together.

17. The transducer of claim 1 wherein the mass has a substantially cylindrical shape.

18. The transducer of claim 1 wherein the mass has a substantially spherical shape.

19. The transducer of claim 1 wherein the mass has a substantially conical shape.

20. The transducer of claim 1 wherein the mass has a substantially rhombic shape.

21. The transducer of claim 1 wherein the mass has a substantially biconical shape.

22. The transducer of claim 1 wherein the fixed portion includes a magnetized portion for being secured to the body of interest, and the body of interest including a ferrous material.

23. The transducer of claim 1 wherein the spring includes a compressive bellows element.

24. An accelerometer comprising:
    a fixed portion configured to be secured to a body of interest;
    a moveable portion having a range of motion with respect to the fixed portion;
    a spring positioned between the fixed portion and the moveable portion;
    a length of fiber wound around the fixed portion and the moveable portion, the length of fiber spanning the spring; and
    a mass engaged with the moveable portion such that the mass moves with the moveable portion, wherein the mass envelopes at least two sides of the moveable portion.

25. The accelerometer of claim 24 wherein the mass also envelopes at least one of the fixed portion, the spring, and the length of fiber within at least one position within the range of motion of the moveable portion.

26. The accelerometer of claim 24 wherein the mass envelopes the fixed portion within at least one position within the range of motion of the moveable portion.

27. The accelerometer of claim 24 wherein the mass envelopes the spring within at least one position within the range of motion of the moveable portion.

28. The accelerometer of claim 24 wherein the mass envelopes the length of fiber within at least one position within the range of motion of the moveable portion.

29. The accelerometer of claim 24 wherein the mass envelopes each of the fixed portion, the spring, and the length of fiber within at least one position within the range of motion of the moveable portion.

30. The accelerometer of claim 24 wherein the mass envelopes at least one of the fixed portion, the spring, and the length of fiber within the entire range of motion of the moveable portion.

31. The accelerometer of claim 24 wherein the mass envelopes the fixed portion within the entire range of motion of the moveable portion.

32. The accelerometer of claim 24 wherein the mass envelopes the spring within at least one position within the entire range of motion of the moveable portion.

33. The accelerometer of claim 24 wherein the mass envelopes the length of fiber within at least one position within the entire range of motion of the moveable portion.

34. The accelerometer of claim 24 wherein the mass envelopes each of the fixed portion, the spring, and the length of fiber within the entire range of motion of the moveable portion.

35. The accelerometer of claim 24 wherein the spring is a biasing spring for providing tension to the length of fiber.

36. The accelerometer of claim 24 further comprising a hinge connected between the mass and the fixed portion to limit the range of motion of the moveable portion to a single linear degree of freedom.

37. The accelerometer of claim 36 wherein the range of motion extends along an axis substantially parallel to an interior wall portion of the mass.

38. The accelerometer of claim 24 wherein the mass and the moveable portion are integrated into a single piece of material.

39. The accelerometer of claim 24 wherein the mass and the moveable portion are separate structures affixed together.

40. The accelerometer of claim 24 wherein the mass has a substantially cylindrical shape.

41. The accelerometer of claim 24 wherein the mass has a substantially spherical shape.

42. The accelerometer of claim 24 wherein the mass has a substantially conical shape.

43. The accelerometer of claim 23 wherein the mass has a substantially rhombic shape.

44. The accelerometer of claim 24 wherein the mass has a substantially biconical shape.

45. The accelerometer of claim 24 wherein the mass houses at least one optical element of the accelerometer.

46. The accelerometer of claim 45 wherein the mass houses the at least one optical element at a portion of the mass at a terminal end of the accelerometer.

47. The accelerometer of claim 45 wherein the at least one optical element includes at least one of a fiber optic coupler, a reflector, a light source, an optical detector, an optical depolarizer, a delay coil of optical cable, and a phase modulator.

48. The accelerometer of claim 45 wherein the at least one optical element includes at least one of a fiber optic coupler, a reflector, an optical depolarizer, and a delay coil of optical cable.

49. The accelerometer of claim 24 wherein the fixed portion includes a magnetized portion for being secured to the body of interest, and the body of interest including a ferrous material.

50. The accelerometer of claim 24 wherein the spring includes a compressive bellows element.

51. A fiber optic sensing system comprising:
an optical source for generating an optical signal;
an optical element for dividing the optical signal generated by the optical source, and for coherently recombining optical signals received by the optical element;
an optical receiver for receiving a combined optical signal downstream of the optical element;
a transducer including (1) a fixed portion configured to be secured to a body of interest, (2) a moveable portion having a range of motion with respect to the fixed portion, (3) a spring positioned between the fixed portion and the moveable portion, and a mass engaged with the moveable portion such that the mass moves with the moveable portion, with the mass enveloping at least two sides of the moveable portion; and
optical fiber extending between elements of the fiber optic sensing system, the optical fiber including a length of fiber wound around the fixed portion and the moveable portion, and the length of fiber spanning the spring.

52. The fiber optic sensing system of claim 51 wherein the fiber optic sensing system is a Sagnac interferometer sensing system.

53. The fiber optic sensing system of claim 51 wherein the fiber optic sensing system is a Michelsen interferometer sensing system.

54. The fiber optic sensing system of claim 51 wherein the fiber optic sensing system is a Fabry Perot interferometer sensing system.

* * * * *